(12) United States Patent
Shields

(10) Patent No.: US 7,991,137 B2
(45) Date of Patent: Aug. 2, 2011

(54) SYSTEM AND METHOD FOR COLLABORATIVE AND SOCIAL GROUP PHONE CONFERENCING

(76) Inventor: Neal G. Shields, Fort Worth, TX (US)

( * ) Notice: Subject to any disclaimer, the term of this patent is extended or adjusted under 35 U.S.C. 154(b) by 1314 days.

(21) Appl. No.: 11/588,668

(22) Filed: Oct. 27, 2006

(65) Prior Publication Data

US 2007/0127669 A1 Jun. 7, 2007

Related U.S. Application Data

(60) Provisional application No. 60/735,034, filed on Nov. 9, 2005.

(51) Int. Cl.
*H04M 3/56* (2006.01)
(52) U.S. Cl. .............. 379/204.01; 370/261; 379/205.01; 455/416
(58) Field of Classification Search .................. 370/260, 370/261, 262; 379/202.01, 203.01, 204.01, 379/205.01, 206.01; 455/416
See application file for complete search history.

(56) References Cited

U.S. PATENT DOCUMENTS

| | | | | |
|---|---|---|---|---|
| 5,631,904 A | * | 5/1997 | Fitser et al. | 370/261 |
| 5,973,724 A | * | 10/1999 | Riddle | 348/14.07 |
| 6,330,320 B1 | * | 12/2001 | Cornell et al. | 379/202.01 |
| 6,694,143 B1 | | 2/2004 | Beamish et al. | |
| 7,020,098 B2 | * | 3/2006 | Ehrsam et al. | 370/260 |
| 7,343,008 B1 | * | 3/2008 | Frankel | 379/202.01 |
| 2005/0136885 A1 | | 6/2005 | Kaltsukis | |
| 2007/0133438 A1 | * | 6/2007 | Shaffer et al. | 370/260 |

* cited by examiner

*Primary Examiner* — Harry Hong
(74) *Attorney, Agent, or Firm* — Bracewell & Giuliani LLP

(57) ABSTRACT

A system to facilitate phone conferencing between a plurality of phone users over a communications network, program product, and methods are provided. Phone conferencing over a communications network is facilitated by a system that forms a server network that enables users to participate in a conference call. A conference management program product is stored in a memory of the server including instructions which allow users of the system to establish conferencing groups and set participation preferences of the members. The system can utilize the preferences to initiate and conduct the conference call.

4 Claims, 3 Drawing Sheets

| My Group | | | | | | | | | | |
|---|---|---|---|---|---|---|---|---|---|---|
| Physics Department | | | | Family | | | | Friends | | |
| Group Priorities | 1 | | | 3 | | | | 2 | | |
| | Extend Invitations | Notify of Invitations | Block | | Extend Invitations | Notify of Invitations | Block | | Extend Invitations | Notify of Invitations | Block |
| F. Crick p1 | X | | | Mom fm1 | | X | | Wanda fr1 | X | X |
| J. Watson p2 | X | X | | Dad fm2 | X | X | | Martha fr2 | X | X |
| R. Franklin p3 | | X | | Uncle Ernie fm3 | | X | | Tom fr3 | | | X |
| M. Wilkins p4 | | X | | Aunt Maud fm4 | | X | | Bob fr4 | | | X |
| L. Bragg p5 | X | X | | Tommy fm5 | X | | | Allice fr5 | X | X |
| L. Pauling p6 | X | | | | | | | Carol fr6 | X | X |
| M. Perutz p7 | | X | | | | | | Ted fr7 | | X |
| O. Avery p8 | | X | | | | | | | | |

| My Conference Log | | | | | | |
|---|---|---|---|---|---|---|
| Groups | Date | Start | Stop | Participants | | Transcript Availability |
| Physics | 11/15/06 | 13:22 | 17:44 | p2, p5, p7, p3 | | YES |

| My Group ||||||||||||
|---|---|---|---|---|---|---|---|---|---|---|---|
| Physics Department |||| Family |||| Friends ||||
| Group Priorities | 1 ||| 3 ||| | 2 ||||
| 38 | Extend Invitations | Notify of Invitations | Block | 38 | Extend Invitations | Notify of Invitations | Block | 38 | Extend Invitations | Notify of Invitations | Block |
| F. Crick p1 | X |   |   | Mom fm1 |   | X |   | Wanda fr1 | X | X |   |
| J. Watson p2 | X | X |   | Dad fm2 | X | X |   | Martha fr2 | X | X |   |
| R. Franklin p3 |   | X |   | Uncle Ernie fm3 |   |   | X | Tom fr3 |   |   | X |
| M. Wilkins p4 |   | X |   | Aunt Maud fm4 |   | X |   | Bob fr4 |   |   | X |
| L. Bragg p5 | X | X |   | Tommy fm5 | X |   |   | Allice fr5 | X | X |   |
| L. Pauling p6 | X |   |   |   |   |   |   | Carol fr6 | X | X |   |
| M. Perutz p7 |   | X |   |   |   |   |   | Ted fr7 |   | X |   |
| O. Avery p8 |   | X |   |   |   |   |   |   |   |   |   |

| My Conference Log |||||||
|---|---|---|---|---|---|---|
| Groups | Date | Start | Stop | Participants | | Transcript Availability |
| Physics | 11/15/06 | 13:22 | 17:44 | p2, p5, p7, p3 | | YES |

*FIG. 2*

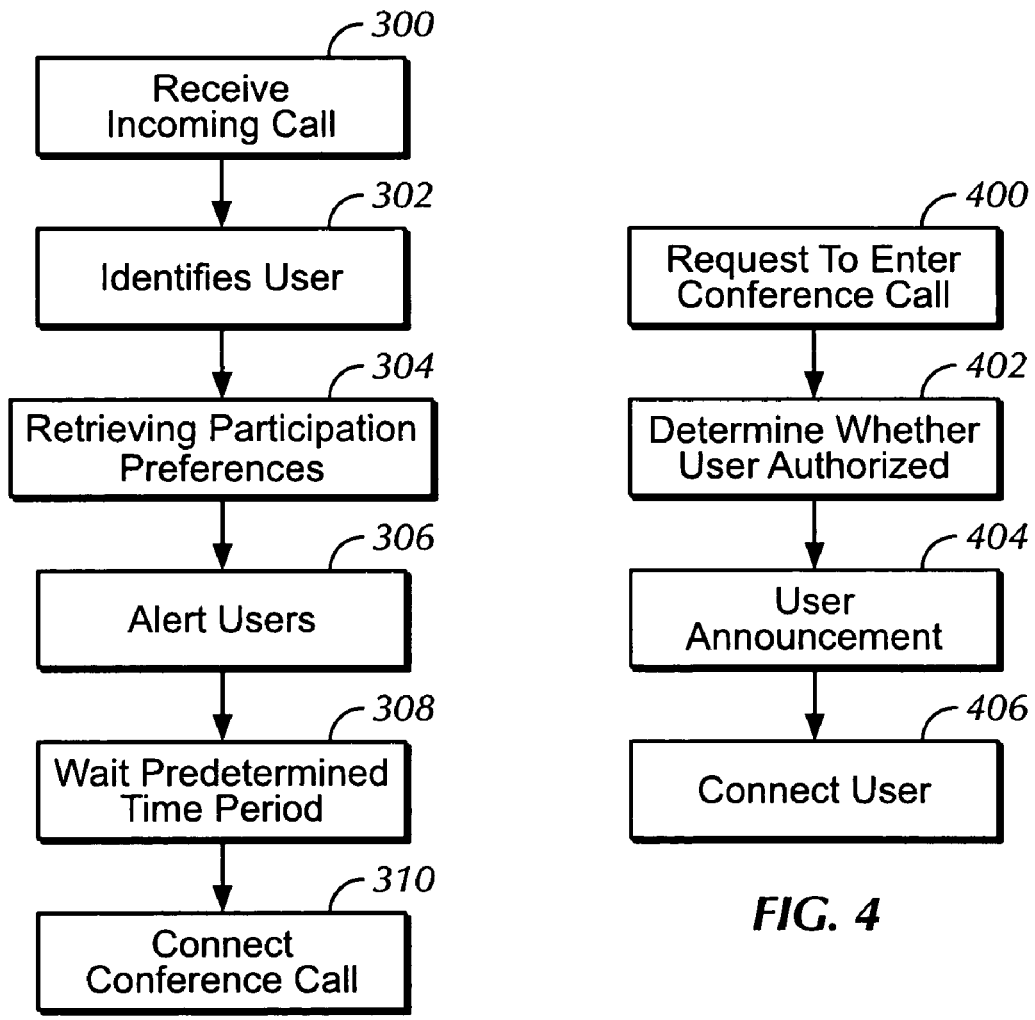

SYSTEM AND METHOD FOR COLLABORATIVE AND SOCIAL GROUP PHONE CONFERENCING

CROSS-REFERENCE TO RELATED APPLICATION

This is a non-provisional patent application which claims priority to and the benefit of Provisional Patent App Ser. No. 60/735,034, filed Nov. 9, 2005, entitled "Collaborative and Social Group Cell Phone Conferencing Device and System," which is incorporated herein by reference in its entirety.

BACKGROUND

1. Field of the Invention

This invention relates in general to phone conferencing, and in particular to user controllability in social group phone conferencing.

2. Description of the Prior Art

Collaborative discussion and social interaction serve various purposes in today's economy. The exchange of ideas and viewpoints helps to encourage innovation and technical advancement. For example, at cafes on university campuses, worldwide, people meet to discuss issue covering various topics. Continuous conversations go on at tables involving the participants. People talk, drink coffee, or have lunch.

As the day goes on, some participants may leave and others may join the discussion, such that by evening, none of the original conversationalists are still left. However, they may return the next day to converse and socialize again. If one is accepted into one of these groups, he or she would simply pull up a chair and sit down. They may or may not participate in the conversation depending on the subject matter and where it went. Sometimes certain groups discussing one issue may join another group and continue a discussion.

The potential of this unstructured form of collaboration between people has been proven time and again to be virtually limitless. Often a chance comment will open the door to innumerable passages of thought. Those chance comments must be enabled and encouraged. Although such dialogue has its usefulness, its shortcomings are evident in that such discussions are limited by time, geographic location, and convenience. Accordingly, the inventor of the present invention realized the need to overcome these impediments as addressed by the present invention.

SUMMARY OF THE INVENTION

In view of the foregoing, embodiments of the present invention beneficially provide systems, program products, methods, and computer readable media which facilitate phone conferencing between a plurality of phone users over a communications network. Embodiments of systems, program product, methods, and computer readable mediums of the present invention advantageously allow users of such to establish exclusive "chat rooms," or conferencing groups, and set participation preferences of members, wherein the system utilizes the preferences to initiate the conference call.

More particularly, an embodiment of the present invention provides a system to facilitate phone conferencing between a plurality of phone users over a communications network. The system includes an administration server having a processor and memory, which is accessible by the network. A conferencing management program product is stored in the memory of the server. The program product includes instructions that, when executed by the administration server, causes the server to perform the operations of: receiving an incoming call from a first user; identifying the first user; determining whether the first user is authorized to initiate a conference call; retrieving data relating to the first user, the data including a set of conference participation preferences selected by the first user; and initiating the conference call according to the set of participation preferences selected by the first user.

Embodiments of methods of facilitating phone conferencing between a plurality of users over a communications network are also provided according to the present invention. An embodiment of a method includes providing an administration server having a processor and memory, which is accessible by the network. A conferencing management program product is stored in the memory of the server, the program product including instructions that, when executed by the administration server, causes the server to perform the operations of: receiving an incoming call from a first user; identifying the first user; determining whether the first user is authorized to initiate a conference call; retrieving data relating to the first user, the data including a set of conference participation preferences selected by the first user; and initiating the conference call according to the set of participation preferences selected by the first user.

Embodiments of a computer readable medium to facilitate phone conferencing between a plurality of users over a communications network is also provided according to the present invention. An embodiment of the computer readable medium includes instructions that, when executed by a computer such as, for example, the administration server, causes the server to perform the operations of: receiving an incoming call from a first user; identifying the first user; determining whether the first user is authorized to initiate a conference call; retrieving data relating to the first user, the data including a set of conference participation preferences selected by the first user; and initiating the conference call according to the set of participation preferences selected by the first user.

By providing the before mentioned system, method, and computer readable medium, the present invention provides increased user control and flexibility over social group phone conferencing.

BRIEF DESCRIPTION OF THE DRAWINGS

Some of the features and benefits of the present invention having been stated, others will become apparent as the description proceeds when taken in conjunction with the accompanying drawings, in which:

FIG. 2 is a schematic chart of a group preference page in accordance with an embodiment of the present invention;

FIG. 3 is a high level flow chart according to an embodiment of the present invention; and FIG. 4 is a high level flow chart according to an embodiment of the present invention.

DETAILED DESCRIPTION OF THE INVENTION

Figure 1:
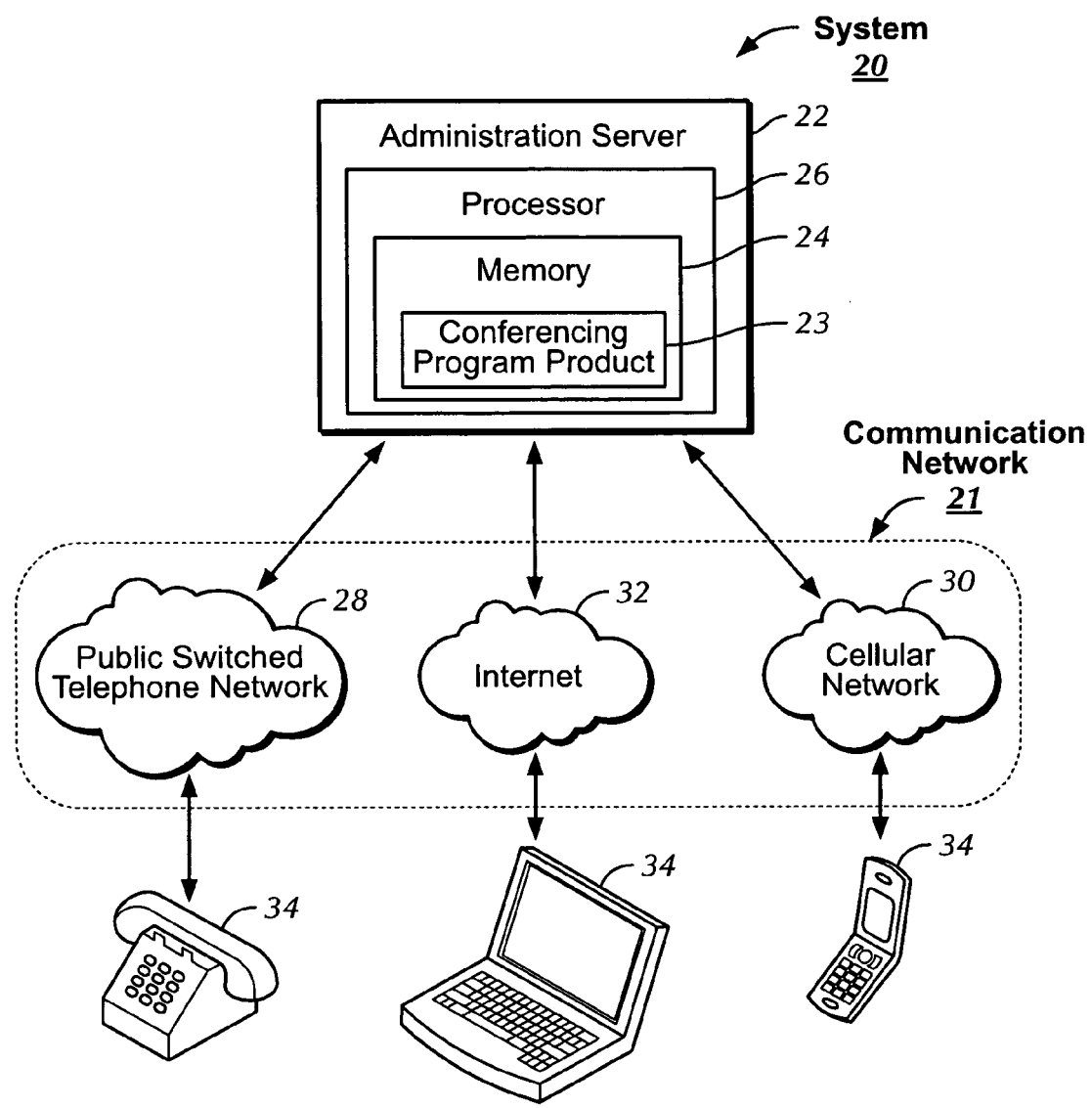
FIG. 1 is an schematic block diagram of a system according to an embodiment of the present invention.

The present invention now will be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be through and complete, and will fully convey the scope of the invention to those skilled in the art. Like numbers refer to like elements throughout.

Referring to FIG. 1, a system 20 including a communications network 21 is illustrated according to an embodiment of the present invention. For example, the system 20 can include administrative server 22 accessible by network 21 to host the phone conferencing between a plurality of users. Administrative server 22 has memory 24 coupled to a processor 26 to store operating instructions therein. However, memory 24 could be a separate remote database or some other form of memory device.

Communications network 21 can also include public switched telephone network 28 and cellular network 30, each being capable of bi-directional analog and digital communications between each other. Administration server 22 can be any well known shared computer located on communications network 21 which functions as the gatekeeper controlling all functions of the present invention.

Processor 26 performs the logic, computational, and decision-making functions of communications network 20 and can take any form as understood by those in the art. Memory 24 can include volatile and nonvolatile memory known to those skilled in the art including, for example, RAM, ROM, and magnetic or optical disks, just to name a few. It should also be understood that the preferred server configuration is given by way of example and that other types of servers or computers configured according to various other methodologies known to those skilled in the art can be used. Administrative server 22, shown schematically in, for example, FIG. 1 can represent a server, server cluster, or server farm and is not limited to any individual physical server. The server sties may be deployed as a server farm or server cluster managed by a server a telecommunications provider. The number of servers and their architecture and configuration may be increased based upon usage, demand and capacity requirements for system 20 or communications network 21.

Public switched telephone network 28 can also form part of communications network 21, thereby allowing users to access administration server 22 through a standard landline telephone. Public switched network 28 refers to the worldwide telephone network accessible to all users with telephones and access privileges, such as, for example, the Bell System Network or the AT&T long distance network.

A cellular network 30 can also form part of communications network 21 and can take the form of any well known cellular mobile telephony system, thereby allowing users to access administration server 22 with a communications device 34, such as a cell phone. Any known telephony network can be integrated into communications network 21, such as those networks known in the art to support various communications devices such as a smart phone, PDA, Blackberries, or other handheld devices used to transmit both analog and digital voice and data information between users. In addition to being a separate unit, administrative server 22 can form part of public switched telephone network 28 or cellular network 30.

Administration server 22 can also be accessed through Internet network 32 via a plurality of communication devices 34, such as user personal computers. Each user communications device 34 can be positioned at one or more user sites remote from the administration server 22 and can take various forms such as, for example, a telephone, cell phone or personal computer that includes a display and input keyboard as is well known in the art. Although illustrated as a keyboard, a user's input can be entered by other forms of devices known to those skilled in the art such as, for example, a light pen, magnetic or optical card reader, trackball, touch screen, touchpad, or mouse. Further, user computers 34 can also take various forms known to those skilled in the art such as, for example, a desktop personal computer, a PDA, mobile telephone, and still other devices for accessing the Internet, that are adapted to interface with communications network 21 while positioned remote from the administration server 22.

Administrative server 22 also includes a conferencing management program product 23 stored, for example, in memory 24 of administrative server 22 and utilized by processor 26 to facilitate phone conferencing between users on the network 20. The conferencing management program product 23 includes functionality to allow various users on network 20 to participate in a conference call, wherein users are allowed to set participation preferences for the conference call.

The participation preferences according to an embodiment of the present invention will now be described. The first user, or moderator, is allowed to set various preferences which dictate interactions between participants of the conference call. Such preferences can include, for example, a file grouping of users selected at will by the first user to be included in the conference call. The moderator can create any number of conference groups and assign members based upon a permanent or temporary basis. In addition, the participation preferences can include names of users who are blocked from the grouping, preferred users, maximum group size, or minimum group size. The participation preferences can be turned on or off by the moderator at will.

The first user, or moderator, can also set participation preferences that include protocols to determine which conference groups can and cannot be merged together. For example, users could and would likely be members of several groups. In practice, a user may be a member of a fraternity group, physics department group, and graduate student group. If the user were participating in a fraternity group conference call and was "pinged" by the physics group, the user could join the two groups together if the moderator authorized the two groups to be merged within the participation preferences. If authorized, users could merge the group by entering a code into communication device 34, which would be transmitted to processor 26 to initiate the merger.

The merging preferences could be directional. This would allow, for example, members of the physics group to merge with the fraternity group, but not the other way around. The moderator could also allow certain groups open access to merge with another group at all times, while only allowing other groups to merge after an access code has been entered. In addition, the processor 26 could include a feature which merges and splits groups in order to maintain an optimal number of conference call participants.

The first user is also allowed to set a number of additional participation preferences via communications device 34. Using, for example, a personal computer as communications device 34, the user can also set parameters for each secondary user within a file grouping. Such parameters can include, for example, which secondary users are also allowed to moderate a conference call and which secondary users are allowed to set participation preferences for the file grouping. After the preferences have been entered by the first user, processor 26 stores them in memory 24.

The first user sets the preferences and otherwise manages the groups by accessing administrative server 22 via communications network 21 using communication device 34. Once accessed, the user is directed to a web site which prompts the user to form a conference group under a given name, such as, for example, "My Fraternity." The first user is then able to select a file grouping of a plurality of users who are authorized to participate in the "My Fraternity" conference call. In the alternative, administration server 22 may also include an automated voice response system which a user can access via communications device 34 and enter his or her participation preferences into memory 24. For example, the user would be prompted by processor 26 to enter his or her participation preferences verbally or with a keypad located on communication device 34. The first user is also allowed to enter a password for the group which will allow each group member to access the group preferences page. Once all preferences have been entered by the user, processor 26 stores all preferences in memory 24 under the first user's designated file.

Referring to FIG. 2, an exemplary embodiment of an online group preferences page 36 is illustrated. As shown, a first user has created three prioritized conference groups, namely, "Physics Department," "Family," and "Friends." Each conference group contains a file grouping 38 of secondary users authorized to participate in the group's conference call. Preference page 36 also includes sections which denote which users to extend invitations, notify of invitations, and which users to block in which conference groups. Furthermore, preference page 38 displays a section entitled, "My Conferences Log," which details each conference group along with conference dates, start and stop times, participants, and transcript availability.

As illustrated in FIG. 3, the conferencing management program product 23 includes instructions that, when executed by administration server 22, causes the administration server 22 to perform various operations in accordance with the present invention. As shown in the high level flow chart of FIG. 3, a first user begins by dialing a pre-determined number that connects the user to administration server 22 via a communications device 34 at step 300. Here, for example, communications device 34 can be a cellular telephone.

Once the first user, or moderator, has dialed into administration server 22, processor 26 (which is implementing conferencing management program product 23) directs administration server 22 to identify the first user (at step 302) from a database of users stored in memory 24. If processor 26 fails to identify the first user as a party authorized to initiate a conference call, processor 26 will terminate the call. If, however, the first user is identified as an authorized party to initiate the conference call, processor 26 can then retrieve the set of participation preferences of the first user from memory 24 at step 304. As discussed above, the participation preferences can include a file group listing of secondary users authorized to participate in the first user's conference call.

Once the participation preferences have been retrieved by processor 26 from memory 24, processor 26 then transmits an alert over communications network 20 to a subset of secondary users in the file grouping contained in the participation preferences at step 306. Once the alert is transmitted, the secondary users will receive the alert at their respective communications devices 34. Such an alert can be in the form of a "ping," which alerts the user with a voice message, ring, beep, tone, vibration, or any other notification known by those skilled in this art. Thereafter, processor 26 waits a predetermined length of time for the secondary users to respond to the alert at step 308. During this predetermined time length, the secondary users can choose to participate in the call by, for example, depressing a key on the keypad of a communication device 34, such as a cell phone, or the user can simply answer the call. If the secondary user chooses to participate in the call, he or she will respond to the "ping" by the necessary action, and the "ping" feature will automatically dial the server. After the predetermined time period, at step 310, processor 26 connects all responding secondary users and the first user to the conference call via communications network 20.

According to an embodiment of the present invention, the conferencing management program product 23 can further include instructions that, when executed by the administration server 22, causes administration server 22 to allow initially non-responsive (or declining) secondary users to enter a conference call after it has already began. As illustrated in the high level flow chart of FIG. 4, a secondary user can send a request to enter an on-going conference call via communications device 34 at step 400. The request is then transmitted over communications network 21 to administration server 22. Processor 26 receives the request and determines whether the secondary user is authorized to enter the conference call (at step 402) based upon the participation preferences set by the first user and stored in memory 24. If processor 26 determines the secondary user is not authorized, the call is terminated.

If, however, processor 26 determines the secondary user is authorized to enter the on-going conference call, processor 26 will begin an automated voice sequence, which alerts the users currently engaged in the conference to the presence of the entering secondary user and also alerts the entering secondary user as to which users are currently involved in the conference call (step 404). Such an alert can be in the form of a stored automated voice announcement of the identity of the users or a graphical or textual message sent to the display of communications device 34. Processor 26 could also utilize a time delay function so that any alert of the entering secondary user is played during a detected pause in the conversion. Moreover, processor 26 could also announce when a user leaves the conference call and periodically announce the names and numbers of the conference call participants. Once the announcement is completed by processor 26, the requesting user is connected to the conference call at step 406.

According to yet another embodiment of the present invention, the conferencing management program product 23 can also include instructions which allow the secondary users to manage and set participation preferences for themselves. Such preferences can include, for example, when the secondary user would like to be alerted of the conference call as shown in FIG. 2. For example, a member may not want to be pinged unless a certain member (or members) was a member of the group or was currently involved in an on-going conference call. Such preferences would be entered by the users via communications device 34 and stored in memory 24 of administrative server 22 in the same manner as previously discussed. The users could also activate and deactivate their participation preferences.

According to yet another embodiment of the present invention, the conferencing management program product 23 can also include instructions which allow the users on the communications network 21 to query the administration server 22 to determine whether any groups, to which they are members, are currently engaged in a conference call. Such a query would be transmitted by the user from the communication device 34 over communications network 21 and to the administration server 22. Processor 26 would then determine whether any file groupings to which the user was a member were involved in a conference call and transmit a listing of such groups (or an audible recording of groups) to communication device 34.

According to yet another embodiment of the present invention, the conferencing management program product 23 can also include instructions which cause the administrative server 22 to transmit a picture of a user to each user communications device 34 while the pictured user is speaking. The images of each user can be stored in memory 24 of administrative server 22. During a conference call, processor 26 can identify which user is speaking and retrieve his or her image from memory 24 and transmit it to each user communication device 34. All users having communication devices capable of displaying such images can then display the images.

According to yet another embodiment of the present invention, the conferencing management program product 23 can also include instructions which allow administration server 22 to record an audio file of the conference call and store it in memory 24. Administration server 22 can further include a replay function utilizing voice compression technology as known by those skilled in this art, which allows the users to access and manipulate the audio file via the communication device 34. Such manipulations can include, a rewind, fast forward, or pause function. For example, such a feature could be utilized when a user entering an on-going conference call desires to hear what has been said previously during the call. After accessing administration server 22, the user could direct processor 26 to replay the audio file from memory 24 at an increased rate of speed yet in an intelligible form, thereby allowing the user to catch up to the real-time dialog.

According to yet another embodiment of the present invention, the conferencing management program product 23 can also include instructions which allow administration server 22 to record an audio file of the conference call and store it in memory 24 and thereafter translate the audio file into a transcript of the conference call. The transcripts could then be made available to members of the file groupings by means of, for example, processor 26 transmitting a data file including the transcript to communication devices 34, allowing users to order the transcripts over the phone, download the transcripts off the Internet, or otherwise make the transcripts available to the users.

According to yet another embodiment of the present invention, the conferencing management program product 23 can also include instructions which prevent cell phones from being handed off between cell cites. This would be useful in preventing minors or others who did not need the distractions from using the system while driving. Depending on the technology employed, this could be accomplished with software in the server 22, by the phone service provider or in the individual cell phone.

According to yet another embodiment of the present invention, the conferencing management program product can also include instructions which allow users to publish a special number which can be used to access the server and restricts direct access to the user's communication device, thereby enabling the server to manage the user's calls.

The present invention could also be based on a subscription fee paid by users of the system. Also, the present invention could be provided by a phone service provider or may be embodied within a user communication device, such as, for example, a smart phone or Blackberry.

It is important to note that while embodiments of the present invention have been described in the context of a fully functional system 20 including conference management program product 23 and methods to facilitate phone conferencing, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and/or instructions related to the conferencing management program product 23 and the method steps described above.

While this invention has been shown in only one of its forms, it should be apparent to those skilled in the art that it is not so limited but is susceptible to various changes without departing from the spirit and scope of the invention. In the drawings and specification, there have been disclosed illustrative embodiments of the invention and, although specific terms are employed, they are used in a generic and descriptive sense only and not for the purpose of limitation, the scope of the invention being set forth in the following claims.

I claim:

1. A system to facilitate phone conferencing between a plurality of phone users over a communications network, the system comprising:
    an administration server being accessible by the communications network to host the phone conferencing, the administration server having a processor and memory coupled to the processor to store operating instructions therein; and
    a conferencing management program product stored in the memory of the administration server to facilitate phone conferencing between users on the system, the conferencing management program product including instructions that, when executed by the administration server, causes the administration server to perform the operations of:
        receiving an incoming call from a first user on the system;
        identifying the first user;
        determining whether the first user is authorized to initiate a conference call;
        retrieving data relating to the first user, the data including a set of conference participation preferences selected by the first user;
        initiating the conference call according to the set of participation preferences selected by the first user;
    wherein the set of conference participation preferences comprises a file grouping of a plurality of secondary users selected by the first user to be included in the conference call, the first user being permitted to set parameters for each secondary user in the file grouping, and wherein the conferencing management program product further includes instructions that, when executed by the administration server, causes the administration server to perform the operations of:
        identifying the secondary users in the file grouping; and
        alerting a subset of the secondary users in the file grouping of the conference call via the communications network;
    wherein the set of conference participation preferences further comprises:
        a preference permitting the first user to create multiple file groupings of secondary users; and
        a preference permitting the first user to set protocols for merging a plurality of file groupings together.

2. The system as defined in claim 1, wherein the conferencing management program product further includes instructions that, when executed by the administration server, causes the administration server to perform the operations of:

permitting the secondary users in the file grouping to set conference participation preferences to determine when they are to be alerted of a conference call; and permitting the plurality of phone users on the system to query the administration server to determine whether any file groupings, of which the respective phone user is a member, are currently involved in a conference call.

3. The system as defined in claim 1, wherein the conferencing management program product further includes instructions that, when executed by the administration server, causes the administration server to perform the operations of:

recording the conference call in an audio file and storing the audio file in the memory;

providing a replay feature which utilizes voice compression technology, the replay feature allowing the users in the subset of the secondary users in the file grouping to join a conference call already in progress and manipulate a replay of the audio file stored in memory, the replay including an accelerated review of missed portions of the conference call and portions of the conference call occurring during the accelerated review, and entry into the conference call being responsive to a completion of the accelerated review;

translating the audio file into a transcript of the conference call; and making the transcripts available to users within the subset of the secondary users in the file grouping.

4. The system as defined in claim 1, wherein the conferencing management program product further includes instructions that, when executed by the administration server, causes the administration server to perform the operations of:

waiting a predetermined time period for all users in the subset of the secondary users in the file grouping to respond to the alert;

after the predetermined time period has elapsed, initiating the conference call by connecting all responding users in the subset of the secondary users in the file grouping and the first user;

allowing other users in the subset of the secondary users in the file grouping to enter the conference call after it has begun;

alerting the other users in the subset of the secondary users in the file grouping entering the conference call of what users are already engaged in the conference call;

alerting the users already engaged in the conference call when users in the subset of the secondary users in the grouping enter or leave the conference call; and transmitting a picture of a first user to a second user calling device when the first user speaks during the conference call, the calling device being capable of displaying the picture.

\* \* \* \* \*